United States Patent Office 3,084,510
Patented Apr. 9, 1963

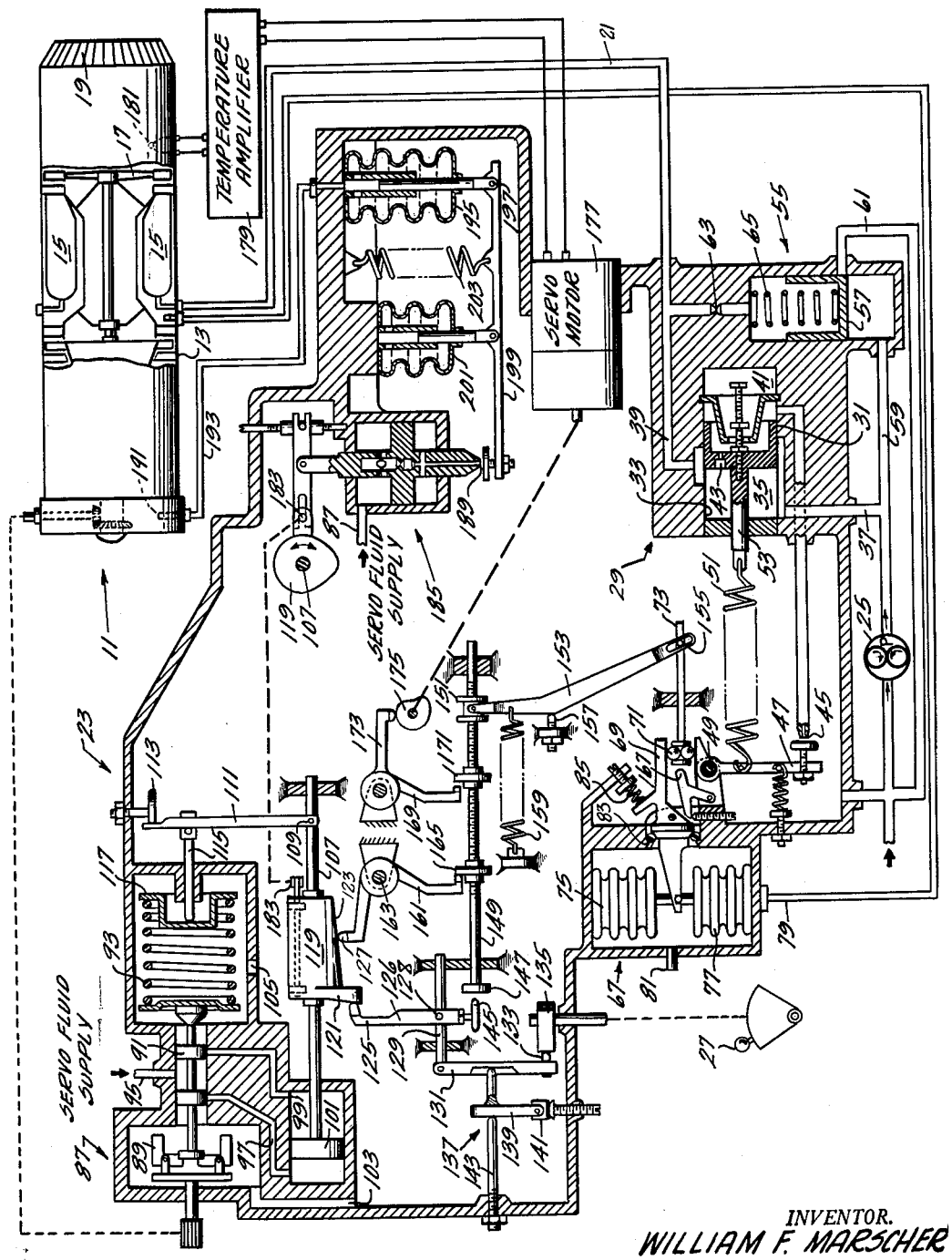

3,084,510
TURBINE ENGINE FUEL CONTROL
William F. Marscher, Devon, Pa., assignor to General
Electric Company, a corporation of New York
Filed Oct. 26, 1960, Ser. No. 65,104
2 Claims. (Cl. 60—39.28)

This invention relates to engine fuel controls and more particularly to fuel controls for turbine engines as used in aircraft jet propulsion and other applications.

Fuel control systems as conventionally constructed for turbine engine application typically provide steady-state engine control by use of an engine speed governor operative to hold engine speed at whatever speed is called for by the throttle lever setting. Operation in this fashion provides at least substantial correlation between throttle lever setting and engine power output, due to the approximate proportionality which usually exists between engine speed and power in the case of shaft power engines, or between speed and thrust in the case of turbojet engines.

To prevent excessively sharp changes in fuel flow to the engine during speed transients such as result from changes in throttle lever setting, it is common to incorporate in control systems of this type suitable means for automatically limiting the permitted rates of increase and decrease of fuel flow to the engine during speed transients. Such automatic imposition of fuel limits is particularly desirable in the case of aircraft engines because this relieves the pilot of the necessity to monitor fuel flow rates during acceleration and deceleration, and at the same time assures that the rate of fuel flow change is the maximum attainable within the limits necessary to protect the engine against over-temperature or compressor stall due to excessive fuel flow and to protect against flameout due to inadequate fuel flow.

The present invention relates to turbine engine fuel systems of the general type just described and has as its principal object the provision of new and improved such systems characterized by simplicity of construction with consequent good reliability of operation and economy of manufacture. It is also an object of the invention to provide a turbine engine fuel control which by virtue of compactness and simplicity of construction is particularly adapted to turbine engines of relatively small size and low cost.

In carrying out the invention in one preferred embodiment, there is provided in combination with a turbine type powerplant including fuel supply means operable to feed fuel to the powerplant in quantities variable in accordance with the position of a control element, a control system for positioning that element in accordance with engine operating parameters integrated in accordance with engine fuel flow requirements for both steady-state operation and transients such as engine acceleration and deceleration. This integration is performed in part by a cam member movable in one direction as a function of engine speed and movable in another direction as a function of another parameter of powerplant operation, with the cam member having at least two camming surfaces each engaged by a cam follower. The fuel control element connects to these cam followers through a floating lever which is spring biased in a direction urging one end into engagement with both cam followers and the two followers into engagement with the cam, with the float mounting enabling movement of one end of the lever without movement of the other when a limit position is reached. One of the two cam followers also is in the form of a floating lever, the pivot point of which is movable by the throttle lever and adjusted thereby to set a called-for steady-state engine speed. The other cam follower provides acceleration fuel flow limiting by exercising control over movement of the fuel control element in fuel flow increasing direction. For deceleration fuel flow limiting, a fixed stop is provided for the fuel control element, with the float mounting of the connecting lever member permitting use of such fixed stop without interference with operation of the cam mechanism.

The invention will itself be further understood and its various objects, features and advantages more fully appreciated by reference to the appended claims and the following detailed description when read in conjunction with the accompanying drawing, the single FIGURE of which is a schematic of one turbine engine fuel control system in accordance with the invention.

The invention is shown incorporated in a fuel control system for an aircraft jet propulsion engine designated generally by reference numeral 11. The engine illustrated is of conventional construction comprising a compressor 13 supplying air under pressure to a plurality of combustion chambers 15 the combustion gases from which pass through a turbine 17 and then discharge through a jet nozzle 19 to provide the desired propulsion effect. In engines of this type, fuel flow to the combustion chambers 15 through supply line 21 must be held at values such as to properly control operation of the engine during both steady-state and transient conditions of operation, and in accordance with the invention such necessary control is provided by the control mechanism designated generally by reference numeral 23.

Before describing in detail the construction and operation of the control 23, certain general principles of turbine engine control might first be mentioned. Commonly, such engine controls are arranged to hold a called-for engine speed and thus function simply as speed governors during steady-state operation of the engine i.e., operation of the engine other than during the periods immediately following a change in setting of the throttle lever and during the acceleration or deceleration which results from such throttle lever adjustment. During acceleration of the engine it is desirable to impose limitations upon the permitted rates of increase of fuel flow, principally to avoid the over-temperature and compressor stall problems which could result from excessively high fuel flow rates, and during deceleration of the engine the permitted rate of decrease of fuel flow is similarly limited principally to avoid failure of combustion in the engine combustion chambers due to inadequate fuel flow. The fuel control system of the present invention operates in this general fashion to provide control of the flow of fuel supplied by a pump 25 to the engine 11 through the fuel line 21, in response to position of the pilot's throttle lever 27 and in accordance with selected engine operating parameters as hereinafter explained.

Fuel flow from pump 25 to the engine is modulated by a fuel metering valve designated generally by reference number 29, which comprises a valve piston 31 slidable in a cylinder 33 formed within the control housing. Valve piston 31 controls communication between an inlet chamber 35 located at one end of the cylinder 33 and supplied with fuel at pump discharge pressure through line 37, and a fuel conduit 39 connecting directly with the fuel line 21 to the engine.

The valve piston 31 is positioned by a servo system of bleed type, with the valve piston itself constituting the servo power piston. Thus, the fluid pressure in chamber 35 acts against the left-hand face of valve piston 31, in opposition to the pressure of fluid within the chamber 41 on the right-hand side of the valve piston. This latter pressure is determined by the relative sizes of a fixed orifice 43 which conveniently may be formed in the valve piston 31 as shown, and a variable orifice constituted by the servo pilot valve 45. Pressure fluid from chamber 35 flows through orifice 43 into chamber 41 to maintain its pressure at controlled level below that in chamber 35, the pressure level held in chamber 41 varying with changes in relative sizes of the open area of fixed orifice 43 and pilot valve 45.

The pilot valve 45 has as its input the position of a bellcrank member 47 pivotally mounted as at 49 to fixed housing structure. A drive spring 51 tensioned between the bellcrank and a stem element 53 extending from valve piston 31 provides the necessary loading force against which is balanced the force generated by the pressure difference across valve piston 31. The servo system just described is of force balance type, and will seek an equilibrium such that the force exerted by drive spring 51 is precisely balanced against the force generated by the pressure differential across valve piston 31, with this balance being maintained by movement of the valve piston 31 and resultant change in tension of spring 51. Such movement of valve piston 31 adjusts the open area of the fuel metering valve and thus modulates fuel flow to the engine in accordance with valve piston position.

To assure that fuel flow through the metering valve 29 to the engine is accurately proportioned to the open area metering valve, this valve has constant pressure drop held across it by a bypass valve designated generally by reference numeral 55. Bypass valve 55 may be of conventional type as shown, and includes a valve piston 57 movable to control communication between a line 59 connecting into the flow line 37 between the pump 25 and the metering valve 29, and a line 61 connecting back to the pump inlet. The bypass flow through this valve is controlled by the pressure differential across the metering valve 29, the downstream pressure from which is communicated to the bypass valve through a damping orifice 63. The differential pressure held by the bypass valve is determined by the force loading of spring 65, since the valve piston 57 always will assume a position such that the force of this spring just balances the force generated by the pressure differential across the valve piston 57.

By holding constant pressure drop across the metering valve 29 it is assured that fuel flow through the metering valve will be accurately proportioned to its open area, and that this desired proportionality will be maintained notwithstanding any variations in resistance to fuel flow downstream of the metering valve. Such variations sometimes are caused, for example, by partial clogging of one or more of the engine fuel nozzles.

Since fuel flow thus is accurately proportioned to metering valve open area, it follows that the position of the metering valve piston 31 provides a reliable measure of the rate of fuel flow to the engine. Also, since the bellcrank 47 to which the left-hand end of drive spring 51 is attached moves very litle in normal operation of the control, this end of the spring may be regarded as fixed and the spring force then is seen to vary directly with and to provide a measure of position of the metering valve piston 31. In this fashion, the loading force of spring 51 may be taken as a measure of the rate of fuel flow to the engine.

As previously noted, the servo system utilized for positioning the main metering valve 31 is of force balance type and accordingly has a force input which balances against the force drive spring 51. This input force is a downwardly directed one which acts against the horizontally extending arm of bellcrank 47 and is generated by a bellows assembly designated generally by reference numeral 67. The net force output of this bellows assembly is transmitted by means of a pivoted lever 69 to a force multiplication ratio varying means 71. The operation of this multiplication device will be more fully discussed hereinafter; suffice it to say here that it comprises a roller assembly 71 which may be translated horizontally as by an attached rod member 73 to differentially vary the effective lever arms of bellcrank 47 and lever 69.

Movement of roller assembly 71 to the right, for example, results in an increase in both lever arms, but the increase in effective lever arm length of bellcrank 47 is significantly greater than that of lever 69, by reason of the proportionately shorter length of the bellcrank lever arm. It follows that such movement of the roller assembly effects a net change in the ratio by which the two opposed forces are multiplied. To continue the example, the proportionately greater increase in effective length of the bellcrank lever arm effected by movement of the roller assembly to the right requires that the bellows assembly 67 exert a significantly greater force than before in order to balance against the force of drive spring 51. Variable ratio force multiplication in this manner is itself known, and as is conventional in such known multiplier arrangements the roller elements of the assembly 71 are free to translate in the direction of the applied force (vertically in the arrangement illustrated) to enable free movement of the roller elements responsive to force unbalance.

The bellows assembly 67 which force-loads lever 69 comprises a compensating bellows 75 and a sensing bellows 77 the interior of which connects through a line 79 to a point in the engine air flow passage preferably just downstream of the compressor, so as to be responsive to compressor discharge pressure. The compensating bellows 75 is evacuated or substantially so and provides compensation for ambient pressure variation, ambient pressure being communicated into the bellows chamber through an orifice fitting 81.

At the point where lever 69 passes through the wall means separating the bellows chamber, which normally is air-filled, from the main body of the control housing, which normally is fuel-filled, the lever is provided with seal means 83 for preventing fluid leakage between the two chambers. This seal 83 preferably is of the construction disclosed and claimed in Patent No. 3,061,315 issued October 20, 1962, to W. P. Anderson et al. and assigned to the assignee of the present application. A spring 85 preferably adjustably mounted as shown is provided for biasing the bellows assembly to effect trim for calibration purposes.

It was previously explained that since the metering valve 29 has constant pressure drop held across it by the bypass valve 55, the position of the metering valve piston provides an accurate measure of fuel flow rate, and that since the tie point for the left-hand end of drive spring 51 does not move significantly in normal operation of the system, the tension of spring 51 provides direct indication of metering valve position. It follows, therefore, that the force tending to rotate bell crank 47, and thus the force which the horizontal arm of the bellcrank exerts upwardly against the roller assembly at any given position thereof, is directly related to metering valve position and thus to the rate of fuel flow to the engine. In other words, the force which bellcrank 47 exerts upwardly on the rollers 71 provides a direct measure of engine fuel flow rate.

The downwardly directed force on rollers 71 imposed by the bellows force lever 69 is directly proportional to compressor discharge pressure. Accordingly, the elements thus far described constitute means for establishing and maintaining a ratio of fuel flow to compressor discharge pressure which is variable as a function of the multiplication ratio afforded by the multiplier assembly, which in turn is controlled by longitudinal movement of the roller unit 71 and pushrod 73 by the mechanism next to be described.

As previously noted, the control system 23 serves during steady-state operation to hold engine speed constant at whatever speed level is called for by the operator, and serves also to limit acceleration fuel flow to the engine as a function of engine speed. In accordance with the invention, these diverse functions of engine speed are introduced into the control system through a single engine speed sensor designated generally by reference numeral 87.

The speed sensor 87 comprises a centrifugal flyweight unit 89 which may be of conventional construction as illustrated, operative to load a pilot valve 91 with a force which varies directly with engine speed and which is balanced against the opposed force of a speeder spring 93. Pilot valve 91 constitutes a servo pilot valve and controls the flow of high pressure servo actuating fluid, which is supplied through a conduit 95, to either of two lines 97 and 99 connected to opposite sides of the servo power piston 101. The pilot valve simultaneously connects the other of the two lines 97 and 99 to drain through a passage 103 or through port 105 open into the interior of the control housing.

Servo piston 101 positions a piston rod 107 having a pivotal connection as at 109 to a feedback lever 111 the upper end of which rests against an adjustable pivot element 113. Intermediate its ends, the feedback lever 111 engages a pushrod 115 and through this rod acts to position a retainer element 117 for the governor speeder spring 93. In operation of the speed sensor just described, the flyweights tend to move outwardly with increasing engine speed and to translate the pilot valve element 91 to the right, thus ducting servo fluid through line 99 to the right-hand side of servo piston 101. The servo piston accordingly will move to the left, rotating the feedback lever 111 about its point of engagement with pivot 113 in a direction to cause movement of pushrod 115 to the left. The resultant increase in compression of speeder spring 93 will counteract the increased centrifugal force on the flyweights 89, thus returning them and the pilot valve 91 to neutral or equilibrium position. In this fashion, the servo piston 101 and piston rod 107 will assume a definite predetermined position for each measured value of engine speed, and the position of these elements accordingly provides an accurate measure of engine speed.

Fixedly secured against longitudinal displacement along the piston rod 107 is a three-dimensional cam element 119 having a pair of camming surfaces 121 and 123. This cam 119 translates as a function of engine speed in the manner just explained, and is rotated as a function of another engine operating parameter in a manner and for a purpose later to be described. The camming surfaces 121 and 123 have associated therewith cam followers 125 and 127 respectively, one of which is normally operative during steady-state operation of the control and the other operative only during transient conditions such as acceleration from one speed setting to a higher speed setting.

The steady-state cam follower 125 is carried by a speed lever 126 which is pivotally mounted as at 127 to a rod 129. This rod 129 is mounted for sliding movement in fixed housing structure as shown, and has pivotally connected thereto one end of a speed reset lever 131 the other end of which is provided with a cam follower 133 operatively engaging a speed reset or throttle cam 135 which may be directly connected to the throttle lever 27 as illustrated, for manuipulation by the operator.

The speed reset lever 131 is pivoted intermediate its ends upon an adjustable pivot assembly comprising a pivot element 139 mounted for vertical adjustment by means 141 and for horizontal adjustment by means 143. These adjustments 141 and 143 constitute means for trimming the maximum and idle speed settings, respectively, as will be further explained hereinafter.

The speed lever 126 at its lower end is provided with a thrust element 145 adapted to bear against an abutment 147 formed on one end of a rod member 149 which is mounted for translatory movement in suitable fixed housing structure as illustrated. Adjacent its other end, rod member 149 carries a collar 151 in which is engaged one forked end of a floating lever 153, the other end of which has a pin and slot connection as at 155 to the push rod 73. Floating lever 153 engages a fixed pivot 157 intermediate its ends, and the lever is loaded against this pivot by a loading spring 159 connected at one end to the floating lever and at its other end to fixed housing structure as shown.

The structure just described constitutes that portion of the control system which is operative under steady-state conditions to provide speed control for the engine. Before describing in detail the operation of this steady-state speed control, however, the structure of the acceleration, deceleration and temperature limits will first be explained.

The acceleration fuel limit is provided by the second camming surface 123 on the three-dimensional cam 119, and the cam follower 127 which engages this camming surface. Cam follower 127 is carried by a bellcrank element 161 mounted for rotation on a fixed pivot 163 into engagement with a second abutment element 165 carried on the rod member 149 and preferably adjustably mounted thereto as illustrated. This structure serves to limit movement of the rod member 149 towards the left, which is the direction for increased fuel flow as would be called for during engine acceleration.

Deceleration fuel flow limiting is provided by a stop element 167 which preferably is adjustably mounted as shown, and serves to limit movement of the roller assembly 71 towards the left as shown in the drawing. In this fashion, there is provided a fixed lower limit to the ratio of fuel flow to compressor discharge air pressure, and regardless of how far the rod member 149 may be translated towards the right in fuel flow decreasing direction, it can shift the roller assembly 71 to the left only to the point of contact with stop element 167, at which point the minimum fuel flow relationship thus established will be maintained. Such movement of rod member 149 to the right is permitted notwithstanding the fact that roller assembly 71 may have run into its stop, by virtue of the floating mounting of the lever 153, which permits this lever 153 to pull away from its pivot 157 against the force of loading spring 159, whenever this deceleration limit position is reached.

If desired, a turbine temperature limit may be introduced by a second bellcrank element 169 rotatable into engagement with a third abutment element 171 adjustably mounted to the rod member 149. The angular position of bellcrank 169 is determined by a cam follower 173 which operatively engages a cam 175 driven by a servo motor 177 preferably of electrical type as illustrated. This servomotor is energized by a temperature amplifier 179 whenever turbine temperature, as sensed by a thermocouple 181 mounted just downstream of the turbine rotor, becomes excessive. Operation of this temperature limit is essentially the same as that of the acceleration limit bellcrank and these two structures could be integrated into single bellcrank assembly if preferred.

As previously mentioned, the three-dimensional cam 119 may be rotated as a function of an engine operating parameter, to introduce another variable into the computation and application of the acceleration fuel flow limits and, if desired, also into the determination of the steady-state speed to be held by the control. To this end, the cam 119 is mounted for free rotation on piston rod 107, and may be rotated thereon by a pin and slot connection as 183 to an actuator designated generally by reference numeral 185. This actuator comprises a bleed servo having a servo fluid supply connection as at 187 and a servo pilot valve 189 controlled by a sensor assembly responsive to air temperature at the compressor inlet.

As shown, this temperature sensor assembly comprises a temperature bulb 191 mounted in the compressor inlet and connected through capillary tubing 193 to the interior of a bellows 195. The free end of this bellows has pivotal connection as at 197 to a lever 199 adjacent one end thereof, the other end of which lever carries the flapper element of servo pilot valve 189. A second bellows element 201 provides compensation for ambient temperature variation at the sensing bellows 195, and by virtue of its location midway between the ends of the lever 199 the compensating bellows length need be only half that of the length of the sensing bellows 195. A spring 203 disposed between the two bellows provides loading for both.

Variation in compressor inlet temperature causes the fluid within bulb 191 to change in volume, and this expansion or contraction of the fluid is reflected via the capillary tubing 193 to bellows 195, with resultant expansion or contraction of that bellows. Such bellows movement is transmitted by the lever 199 to control the pilot valve 189 of bleed servo 195 and, through action of the servo, positions the three-dimensional cam 119 as a direct function of the compressor inlet temperature.

In this fashion, compressor inlet temperature may be introduced as a variable into the control of steady-state engine speed by properly contouring the end face of cam 119 against which the speed lever cam follower 125 is engaged, and may be introduced into the control of acceleration fuel flow by properly contouring the cylindrical body portion of the cam 119 against which the limit cam follower 127 is engaged. The purpose and effect of introducing this temperature factor will be discussed hereinafter with reference to overall operating characteristics of the system.

Operation

The system is shown with its parts in the positions which they occupy during normal acceleration of the engine, i.e., during an increase in engine speed responsive to advancement of the engine throttle lever 27 but before the called-for speed is reached. As the engine accelerates, the flyweights 89 move outwardly and, acting through pilot valve 91 and servo power piston 101, cause the three-dimensional cam 119 to translate towards the left. The contour of this cam is such that as it moves towards the left, the acceleration limit bellcrank 161 may rotate in clockwise direction, allowing leftward translatory movement of the rod member 149, until it comes into contact with the follower element 145 carried on speed lever 126. When this occurs, further movement of rod member 149 towards the left is halted, and the fuel flow increase which is consequent upon leftward movement of this rod member is likewise halted.

The speed lever 126 and its associated linkage to the three-dimensional cam 119 and to the speed reset cam 135 now becomes loaded, and the speed lever accordingly can exercise control over position of the rod member 149 and the fuel control element positioned thereby. At this point, the engine has reached the called-for speed, and if speed should continue to increase above this called-for value, the resultant leftward movement of cam 119 will cause counterclockwise rotation of speed lever 126 forcing the rod member 149 towards the right and decreasing the fuel flow such amount as may be necessary to bring engine speed back down to the level called for. During steady-state operation at this speed, cam 119 will move back and forth slightly in response to any change in engine speed and will act through speed lever 126 and rod member 149 to adjust fuel flow as necessary to hold the called-for engine speed as determined by the setting of the speed reset cam 135 by throttle lever 27.

As previously explained, rod member 149 and the multiplier roller assembly 71 do not act to set engine fuel flow directly as such. Instead, they act to determine the multiplication ratio between compressor air discharge pressure and fuel flow, and to vary this ratio as may be necessary to reach and maintain balance between the air pressure derived force and the fuel flow proportional force which are balanced against each other through the multiplier. This arrangement affords several significant advantages, principal among which are the resultant de-drooping of the steady-state speed control and the substantial reduction in the range of travel required of the roller assembly 71 in order to attain and hold a called-for engine speed.

If the rod member 149 and floating lever 153 were linked directly to the main fuel metering valve 29 rather than through the multiplier arrangement shown, then clearly for every position of the speed cam 119 there would be a corresponding definite position of the metering valve piston 31. Now if a change in engine load occurs, as for example could be caused by supply of colder more dense air into the compressor inlet, the engine would tend to slow down and would require supply of a greater quantity of fuel in order to hold the called-for engine speed. With this arrangement, however, such increase in fuel flow could be obtained only by movement of the cam 119 towards the right as a result of engine speed decrease, at which point a new equilibrium would be reached. Thus with change in load a change in the engine speed level actually held is necessary in order to accommodate to the load. This phenomenon is well known to those well skilled in the governor art and is commonly termed "droop."

With the arrangement shown, the engine speed control is de-drooped by virtue of the fact that compressor discharge pressure, which provides a measure of engine load, is introduced into the control in a manner to assist the speed governor by increasing the fuel flow automatically with increasing engine load as manifested by compressor discharge pressure. In other words, as load increases this results in an increase in compressor discharge pressure, and this increases the downwardly directed force which the bellows assembly exerts on roller unit 71, with consequent increase in fuel flow proportionate to the increase in load thus sensed.

A second result which obtains from this arrangement is a reduction in travel required of the roller assembly 71. This follows because a substantial fraction of the total change in fuel flow necessary to attain and hold a called-for engine speed is effected by the compressor discharge pressure input to the control, and the roller unit 71 therefore need move only through a relatively small distance in order to provide the required range of variation of fuel flow necessary through the various operating regimes of the engine. In other words, the roller unit 71 need not control actual fuel flow rate, but rather need control only the ratio between actual fuel flow rate and compressor discharge pressure, and this ratio varies through a substantially smaller range than does the fuel flow rate itself.

As previously noted, the parts are shown in the positions they occupy during an engine acceleration of substantial magnitude. Under these conditions, the acceleration limit bellcrank 161 has its cam follower 127 in engagement with cam 119 and engages also the abutment element 165 on rod member 149 to limit movement of that member in fuel flow increasing direction. In this fashion, the rate of increase of fuel flow to the engine is limited as a function of engine speed, so that fuel flow to the engine will not exceed a rate which the engine can safely accommodate without overtemperature or compressor stall.

Compressor inlet air temperature is factored into this phase of the control operation by rotation of the three-dimensional cam 119 as a function of inlet air temperature. Compressor inlet air temperature is significant to turbine temperature limitation, since obviously turbine temperature is a function of entering air temperature as well as of the temperature increase due to combustion, and is significant also to compressor stall propensities due to operating characteristics of axial flow compressors such as that shown. The contour of the three-dimensional cam 119 in axial section is cut to accommodate the engine acceleration fuel flow rate to these engine characteristics at each axial position, i.e., at each speed value, along the length of the cam 119.

A second upper limit on fuel flow to the engine is provided as a function of turbine temperature as sensed by the thermocouple 181 downstream of the turbine. The temperature signal from this thermocouple drives servo motor 177 and cam 175 to rotate the bellcrank 169 in counterclockwise direction into engagement with abutment element 171 causing movement of the rod member 149 towards the right, in fuel flow decreasing direction. In this fashion, it may be assured that turbine temperature does not exceed maximum safe values irrespective of operation of the remainder of the control system.

Turning now to operation of the system during deceleration, movement of throttle lever 27 towards "idle" position will act through speed reset cam 135, speed lever 126 and the rod member 149 to cause clockwise rotation of floating lever 153 about its pivot 157. If the deceleration called for is a substantial one, this clockwise rotation of lever 153 will bring the roller unit 71 into contact with stop element 167, halting further movement of the roller unit 71. Continued movement, in clockwise direction, of the floating lever 153 still is possible by virtue of its float mounting, with the lever 153 simply pulling away from the pivot 157 against the force of its loading spring 159. Since the roller unit 71 now is stationary, it will hold a constant ratio between fuel flow and compressor discharge air pressure as the engine decelerates, with the rate of fuel flow to the engine decreasing gradually as compressor discharge air pressure decreases with falling speed of the engine.

As engine speed approaches the called-for value, the three-dimensional cam 119 will translate to the right sufficiently to rotate speed lever 126 to a position such that rod member 149 and the attached floating lever 153 are moved to positions in which the floating lever again contacts its pivot 157. At this point, the speed governor again assumes control of fuel flow and operates to hold engine speed constant at "idle" or other speed lever called-for by the throttle lever setting. By thus providing minimum fuel flow control varying as a function of compressor discharge air pressure, better protection against flameout due to inadequate fuel supply is provided, and the required time for engine deceleration is minimized.

As previously noted, the cam surface 121 against which rides the steady-state control cam follower 125 may be made either flat or contoured. If the latter, then the steady-state speed held by the control at any given setting of the throttle lever will vary as a function of compressor inlet air temperature. Such controlled variation of steady-state speed, particularly at and near maximum speed settings, is frequently desired for the purpose of enabling slightly higher maximum speed values on hot days when higher engine speeds are necessary to realize maximum thrust. Reduced speed maximums may be desired at low values of compressor inlet air temperature to prevent over-stressing the engine.

Adjustment of the maximum speed held by the control is afforded by vertical movement of the means 141 which mounts the adjustable pivot assembly 139 so as to vary the effective lever arm ratio of the speed reset lever 131. As the element 139 is adjusted upwardly and downwardly, this varies the extent of movement of the upper end of speed reset lever 131 which results from movement of its lower end by the speed reset cam 135 responsive to throttle lever adjustment. Adjustment of "idle" speed setting is afforded by horizontal adjustment of the stop element 143, which determines the limit of leftward movement of the speed reset lever 131 and consequently of the rod 129 to which speed lever 126 is pivoted.

It is to be noted that the configuration of these minimum and maximum speed adjustments is such that each has little affect upon the other. Thus, the maximum speed adjustment is by movement of element 139 in the vertical direction and adjustment of minimum speed settings is by movement of this element in the horizontal direction, there is little interaction between the two adjustments and change in both speed settings may be affected in simple manner and with good precision.

While only one embodiment of the invention has been described and illustrated by way of example in the foregoing, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. In a fuel control for a turbine type power plant including fuel supply means operable to supply fuel to the power plant at flow rates variable in accordance with position of a control element, a cam member having a pair of camming surfaces, means operable to position said cam member as a function of engine speed, a pair of cam followers each adapted to engage one of said camming surfaces, a first lever member carrying one of said cam followers adjacent one end thereof and pivoted intermediate its ends to first movable pivot means, a second lever member connected at one end to said first movable pivot means and pivoted intermediate its ends to second movable pivot means, throttle lever means connected to the free end of said second lever member to move the same with change in throttle lever position, means for shifting said second movable pivot means along a line substantially parallel to said second lever member for maximum speed adjustment and along a line substantially normal thereto for idle speed adjustment, a third lever member carrying the other of said cam followers adjacent one end thereof and provided with fixed pivot means intermediate its ends, linkage means adapted to engage the free ends of either or both said first and third lever members and including a floating lever affording such engagement at its one end and connected to said control element at its other, and a loading spring connected to said linkage means urging it into engagement with said first lever member for steady-state engine speed control about a control point determined by throttle lever position and into engagement with said third lever member for fuel limiting as a function of engine speed.

2. In a fuel control for a turbine type power plant including a compressor, combustion chamber and turbine in serial flow relation and fuel supply means operable to supply fuel to said combustion chamber at flow rates variable in accordance with position of a fuel control element, force balance servo means for positioning said control element to provide fuel flow rates varying directly with an applied force, means responsive to compressor discharge pressure to generate a force varying directly therewith, force multiplier means coupling said compressor discharge pressure derived force to said servo means and including a ratio adjustment member movable to vary the force multiplication ratio afforded by said multiplier means, a cam member having a pair of camming surfaces, means operable to position said cam member as a function of engine speed, a pair of cam followers each adapted to engage one of said camming surfaces, first lever means carrying one of said cam followers adjacent one end thereof and pivoted intermediate its ends to movable pivot means, throttle lever means connected to shift said movable pivot means with change in throttle lever position, second lever means carrying the other of said cam followers adjacent one end thereof and provided with fixed pivot means intermediate its ends, linkage means adapted to engage the free ends of either or both said first and second lever means and including a floating lever connected at one end to said multiplier ratio adjustment member and having separable engagement with fixed pivot means intermediate its ends, a loading spring connected to said linkage means urging said floating lever against its pivot and said linkage means into engagement with said first lever means for steady-state engine speed control about a control point determined by throttle lever position and into engagement with said second lever means for fuel limiting as a function of engine speed, and fixed stop means limiting movement of said multiplier ratio adjustment member in the direction providing reduced force multiplication ratio and thus maintain a constant ratio between engine fuel flow and compressor discharge pressure so long as said multiplier ratio adjustment member remains in engagement with said fixed stop means.

References Cited in the file of this patent

UNITED STATES PATENTS

| | | |
|---|---|---|
| 2,807,138 | Torell | Sept. 24, 1957 |
| 2,909,896 | Porter | Oct. 27, 1959 |
| 2,923,128 | Fortmann | Feb. 2, 1960 |
| 2,960,826 | Hall | Nov. 22, 1960 |

FOREIGN PATENTS

| | | |
|---|---|---|
| 64,638 | France | Nov. 30, 1955 |
| | (1st addition to No. 992,396) | |
| 820,913 | Great Britain | Sept. 30, 1959 |